E. DOUBLE, DEC'D.
A. DOUBLE, ADMINISTRATRIX.
UNDERREAMER.
APPLICATION FILED JAN. 24, 1919.
1,388,105.
Patented Aug. 16, 1921.
6 SHEETS—SHEET 1.
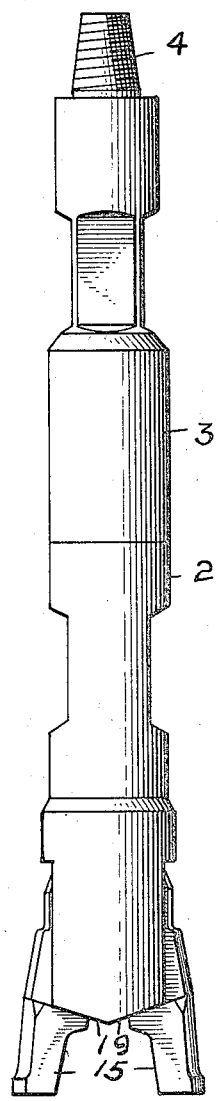
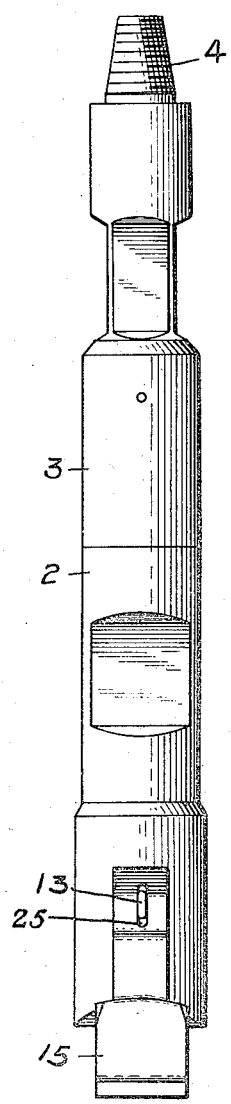

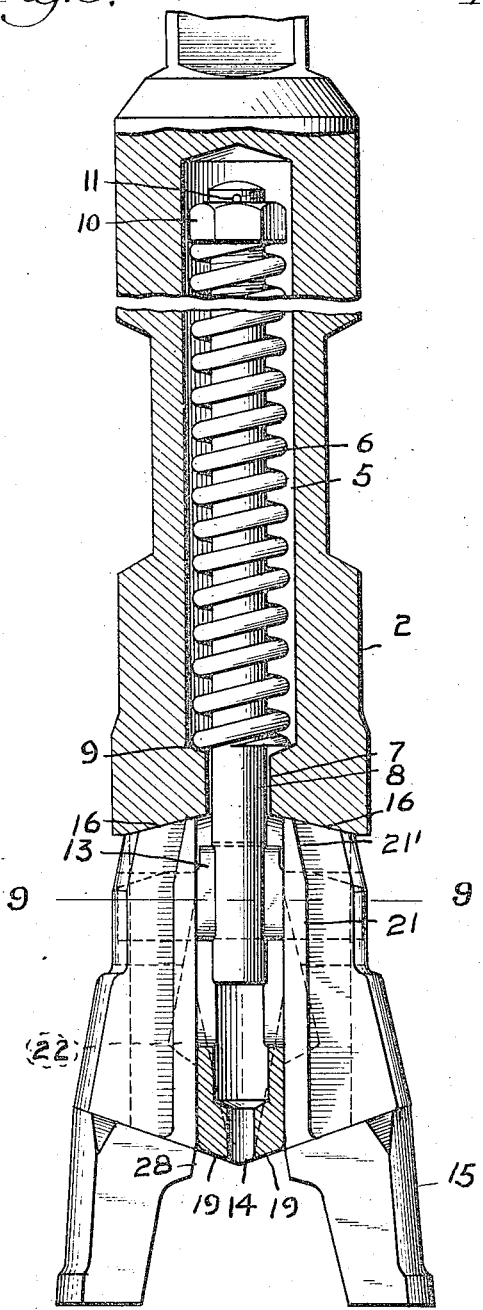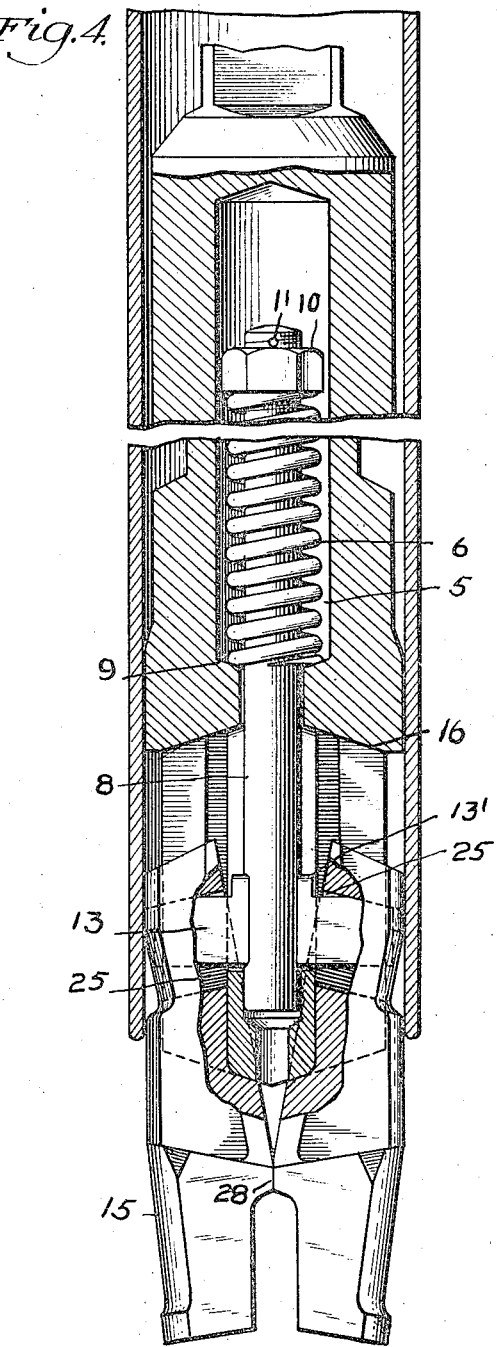

E. DOUBLE, DEC'D.
A. DOUBLE, ADMINISTRATRIX.
UNDERREAMER.
APPLICATION FILED JAN. 24, 1919.

1,388,105. Patented Aug. 16, 1921.
6 SHEETS—SHEET 3.

Witnesses:

Inventor:
Edward Double,
By Frederick Whyon
Attorneys

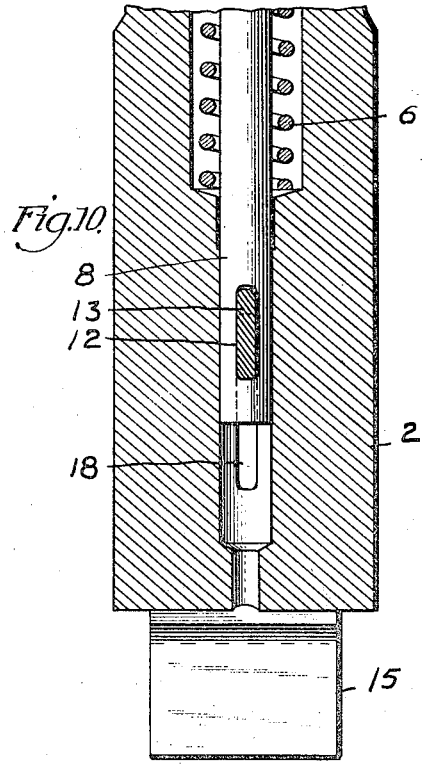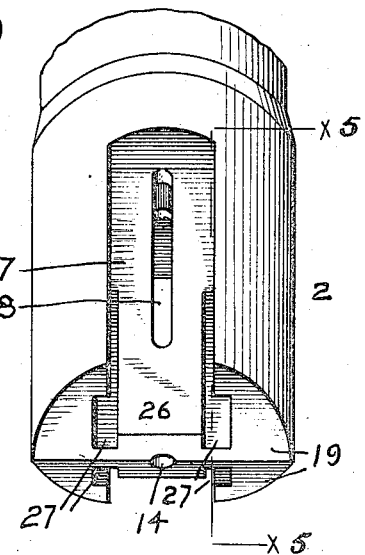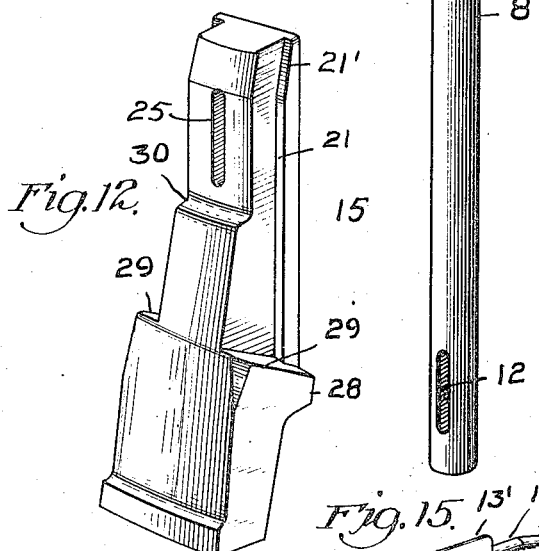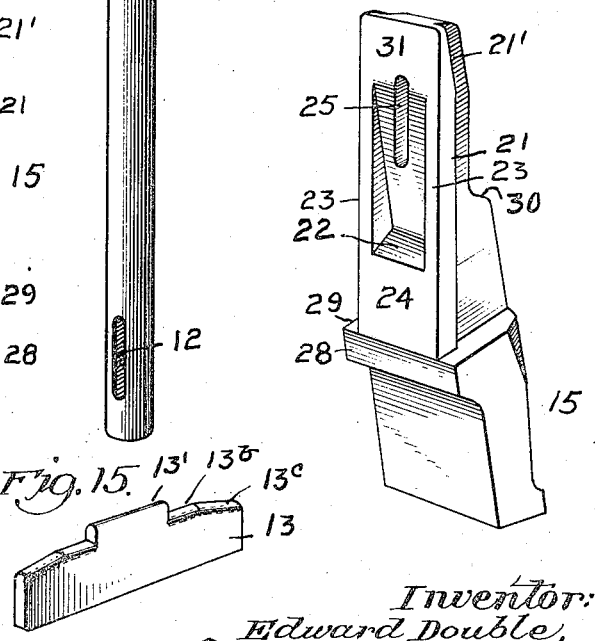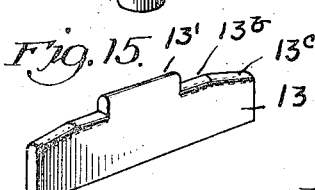

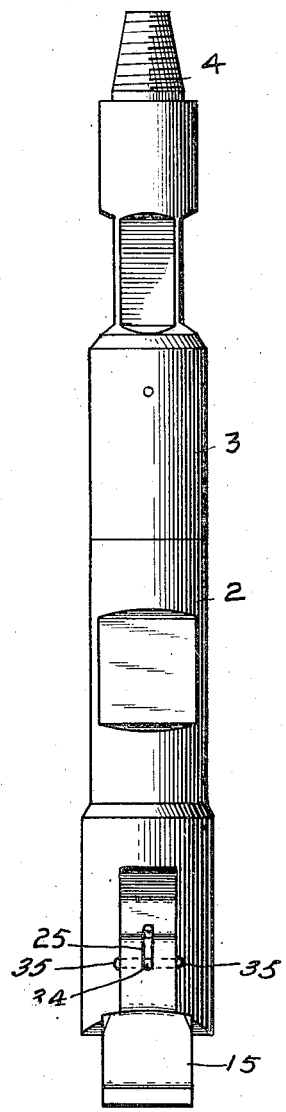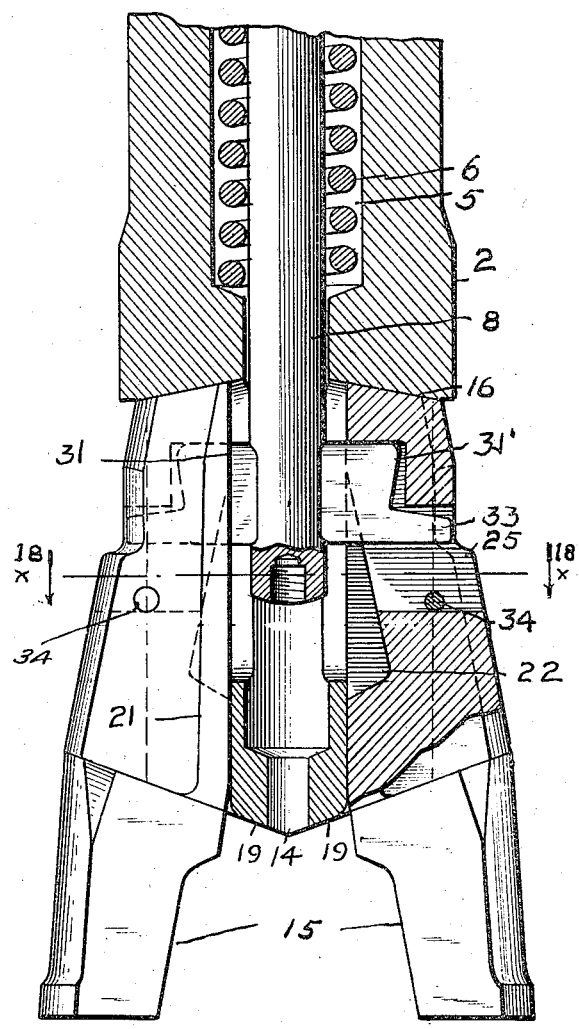

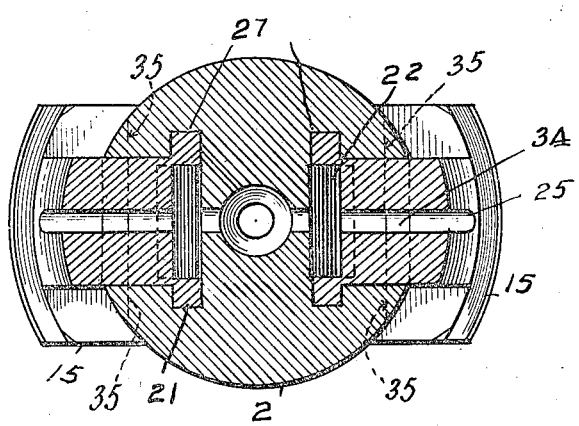
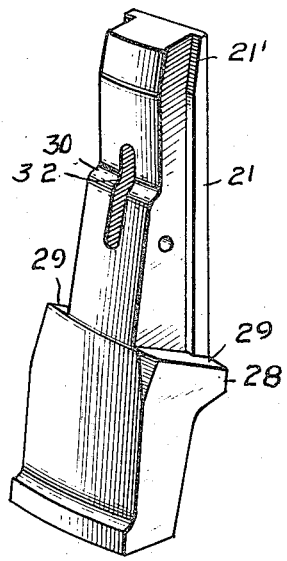
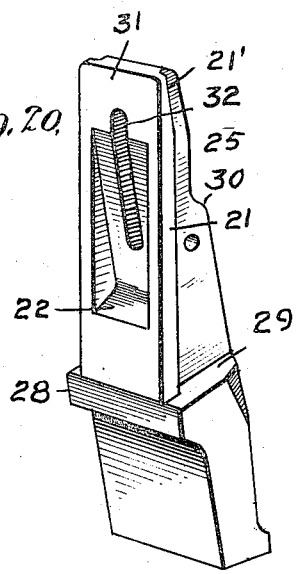
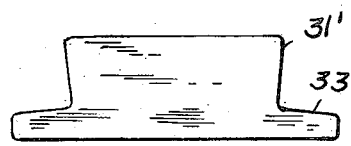

UNITED STATES PATENT OFFICE.

EDWARD DOUBLE, OF LOS ANGELES, CALIFORNIA; ALICE DOUBLE ADMINISTRATRIX OF SAID EDWARD DOUBLE, DECEASED.

UNDERREAMER.

1,388,105.                    Specification of Letters Patent.    Patented Aug. 16, 1921.

Application filed January 24, 1919. Serial No. 272,810.

*To all whom it may concern:*

Be it known that I, EDWARD DOUBLE, a citizen of the United States of America, resident of Los Angeles, in the county of Los Angeles, State of California, have invented certain Improvements in Underreamers, of which the following is a specification.

This invention relates to underreamers for enlarging the bore of Artesian and oil well holes to permit the lowering of the casing.

Among the several objects of the invention are the provision of extremely strong cutters or bits; adquate bearing surfaces to withstand the various strains to which the parts are subject in operation; efficient and simple means for holding the cutters or bits in expanded position for underreaming while in use and providing for their positive collapsion while being inserted into or withdrawn from the well hole; simple and positive means, for mounting and holding the cutters in operative connection with the reamer body, when such cutters require replacement or re-sharpening; and such a construction and interrelation of parts as shall be simple, positive and durable and more economical to manufacture.

These and other objects will be apparent from an explanation in detail of a preferred construction embodying my invention which may be readily understood by reference to the accompanying drawings, forming part of this specification, and in which:

Figures 1 and 2 are side elevations, of an underreamer embodying my invention, showing the cutters in the expanded position for underreaming.

Fig. 3 is a partial longitudinal sectional view, a portion of the upper end of the body portion being broken away and the parts illustrated in the positions which they assume when the cutters are in expanded or underreaming position.

Fig. 4 is a similar view illustrating the withdrawal of the tool into the well-casing after service, the various parts illustrated in the positions which they assume when the cutters are in collapsed position for withdrawal from or insertion into service.

Fig 10 is a partial longitudinal sectional view illustrating the chamber and seat for the spring, the assemblage of the spring, the mandrel or rod actuated by the spring and the removable key upon which the cutters are mounted, and the bore in which the lower end portion of the rod works.

Fig. 11 is a partial perspective view of the body with the cutters, key and rod removed.

Figs. 12 and 13 are perspective views of the cutters or bits.

Fig. 14 is a perspective view of the mandrel or rod.

Fig. 15 is a perspective view of the key.

Fig. 16 is a side elevation of a preferred embodiment of my invention.

Fig. 17 is a partial longitudinal sectional view of such preferred embodiment of my invention, the parts being illustrated in the positions they assume when the cutters are in expanded position ready for underreaming.

Fig. 18 is a sectional plan view on the line $x^{18}$—$x^{18}$ of Fig. 17.

Figs. 19 and 20 are perspective views of the cutters or bits of this preferred construction.

Fig. 21 is a perspective view of the key illustrated in Fig. 17.

Figure 5:
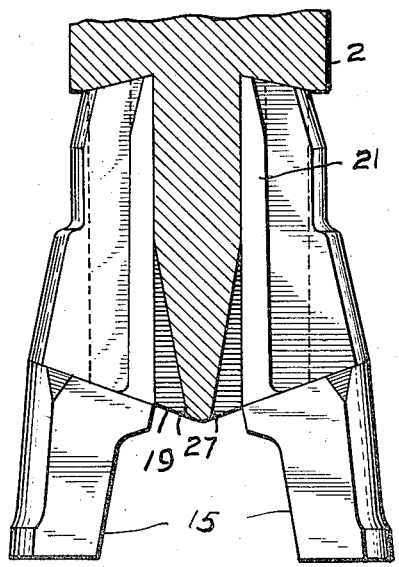
Fig. 5 is a detail sectional view, on enlarged scale on line $x^5$—$x^5$ Fig. 11, illustrating the expanded position of the cutters and the relations of the thrust bearings of the cutters and body.

As shown in the drawings 2 represents the body proper and 3 the "sub". These are connected together in the well-known manner, as, for instance, by a box and pin joint. (Not illustrated in the drawings, as it is well known in the art.) The "sub" has the usual tapered pin 4 connection with the usual jars, stem or other part of the string of drilling tools.

The body 2 is bored out from its upper end to provide a chamber 5 to receive a coiled spring 6, and is provided with a secondary bore or chamber 7 in which the lower end of the mandrel or rod 8 works. Within the chamber 5 the spring 6 surrounds this rod. The lower end of the spring rests upon the shoulder 9. The upper end of the rod 8 is threaded to receive a nut by means of which tension of the spring may be imparted between the shoulder 9 and nut 10 to the rod 8 to normally hold the rod in its upper or retracted position. 11 represents a hole through which a cotter pin (not shown) may be inserted to prevent the nut 10 from working loose. Near its lower end the mandrel or rod 8 is provided with a slot 12 to receive the cutter-supporting key 13. The body is preferably provided with a small bore 14 extending into the bore 7, through which the usual rod may be inserted to screw into the lower end of the rod 8 to draw the same down against the tension of the spring 6. As this is a well known means it is not shown in the drawings and any convenient means for drawing down the bits and rod 8 may be employed.

The lower end portion of the body 2 is shown provided on opposite sides with dovetailed or shouldered slipways in which the shanks of the cutters 15 extend. At the upper ends of these slipways the walls of the body are preferably inwardly and upwardly inclined to form up thrust bearings 16. The upper end surfaces of the cutters are beveled or inclined to correspond with the inclination of the up-thrust bearings 16.

As shown in the drawings I prefer to retain a central web 17 in the body between the slipways. A key-way 18 is formed in this unit 17 to permit the key 13 and rod 8 vertical movement in the reamer.

The end of the body 2 is beveled, being inclined downwardly and inwardly from each slipway toward the body center, to form expanding surfaces 19 and also to take the thrust in underreaming.

Figure 6:
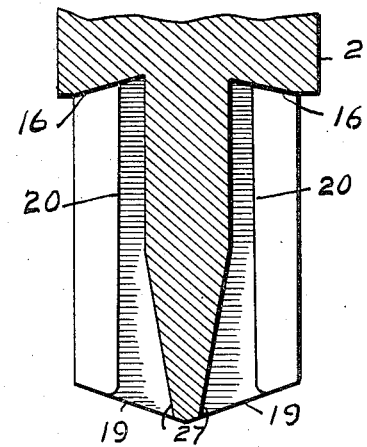
Fig. 6 is a detail sectional view, like Fig. 5, with the cutters removed, more clearly illustrating the thrust bearings and dovetail ways of the body.
Figure 7:
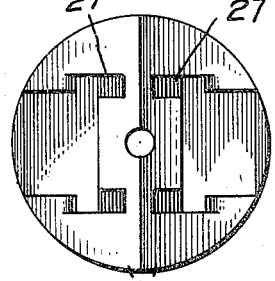
Fig. 7 is an inverted plan view of the body with the cutters removed.
Figure 8:
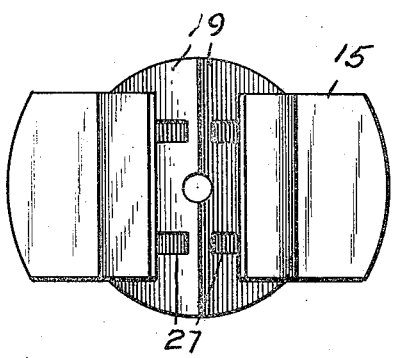
Fig. 8 is an inverted plan view with the cutters in expanded position.
Figure 9:
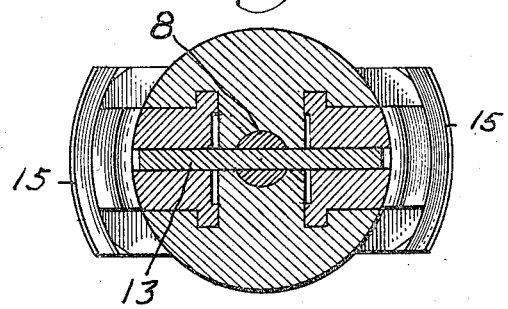
Fig. 9 is a transverse section on the line 9—9 of Fig. 3.

The shoulders or dovetails 20 at the sides of the slipways preferably are inclined upwardly and inwardly (see Fig. 6) from the bottom of the body or mouth of the underreamer. Coacting with these are shoulders or dovetails 21 on the shanks of the cutters or slips 15, the upper ends of these dovetails 21 are preferably beveled off as shown at 21' to permit the initial collapse of the cutters and of the cutter shanks in the body.

The expansion shoulder or bearing 22 of the respective cutters is formed by the inclined lower wall of a pocket formed in the inner or back face of the cutter shank, the inner wall of this pocket being preferably inclined upwardly and outwardly (from its junction with the shoulder 22) to retain the desired strength in the cutter shank. The side walls 23 of this pocket form strengthening ribs the faces of which are preferably continuations of the plane surface of the inthrust bearing 24 of the cutter. This inthrust bearing surface 24 of the cutter extends across the shank of the cutter; 25 represents the key slot, in the cutter shank, in which the key 13 is mounted.

The inthrust bearing 24 of the respective cutters rests upon its respective inthrust bearing 26 on the body when the cutters are in expanded position. On each side of the respective inthrust bearings 26 of the body I provide an inclined groove or way 27, the pitch of the inclination of these grooves being such that they will permit the cutters 15 to completely collapse or swing inwardly toward each other as soon as the cutters have been drawn down from the slipways a sufficient distance to permit the expansion shoulders or bearings 22 to ride over or upon the inclined expanding surfaces 19 of the body. These grooves or ways 27 simply receive the strengthening ribs 23 of the cutter shanks, forming pockets into which the ribs 23 swing, the expansion or wedging apart of the cutters being accomplished by the shoulder 22 riding upwardly and outwardly on the shoulder or surface 19 of the body, neither the ribs 23 or grooves 27 having any part in causing such expansion.

As shown in the drawings, the plane surface 28, on the inner face of the cutter body, does not bear on any portion of the underreamer body, the body of the cutter extending wider than the shank to provide the upthrust shoulders 29 which contact with the end surfaces 19 of the reamer body when the cutters have been expanded.

30 indicates the shoulder, on the outside or front face of the cutter shank, which contacts with the end of the casing or casing shoe to cause the collapsion of the cutters.

The plane face 31 at the upper end of the cutter shank when in underreaming position bears inwardly upon the face of the web 17. If the web 17 be cut away or omitted and a solid T or head provided on the mandrel or rod 8 this surface 31 may bear directly upon or against the rod.

The key 13 is preferably straight at the bottom and ends. At the top it has a projection 13' of a width substantially equal to the thickness of the web 17 so that it does not project out into the key-slots of the cutter shanks.

At each end of this projection the key is provided with a straight bearing surface, 13ᵇ upon which the cutter shank is mounted, these surfaces terminating in downwardly beveled portions 13ᶜ at the ends of the key to permit the tilting action of the cutters.

The key slots or seats 25 are somewhat larger or longer than the vertical width of the key at 13ᵇ to permit such tilting action.

In Figs. 16–21 I have shown the preferred embodiment of my invention. In this embodiment the "pocket" cutters, (i. e. a cutter in whose shank the expansion shoulder is formed, with strengthening metal surrounding such pocket) and the grooves or ways 27 at the sides of the inthrust bearings on the body are employed.

In order, however, to further prevent breakage or bending of cutter shanks, due apparently to the key 13 sometimes binding or wedging in one of the cutters, probably due to lateral travel of the key when the cutters are collapsed and such subsequent binding or wedging such cutter against traveling up into full reaming position when expansion is permitted and the forcible driving of such cutter to full reaming position upon the commencement of the underreaming operation, I substitute for such key 13 a key 31 (see Fig. 21) the body portion of which at its top is of sufficient length to extend through the rod 8, web 17 and into a socket or inclosed slot portion 32 of each of the cutter shanks. This socket is provided above the open slot 25 through the cutter shank and forms a continuation thereof in the inner face of the cutter shank, but as stated, does not extend through the cutter shank. The key 31 is provided with tangs 33 at its lower edge. These tangs at all times extend into the open portions 25 of the keyseats of the cutter shanks. The ends of the main body of the key 31 are downwardly and inwardly inclined and the upper edges of the tangs are beveled or inclined downwardly and outwardly from the point where such inwardly inclined ends of the main body of the key unite with the upper edges of the tangs, to permit the tilting of the cutters on the key. To prevent the possibility of the key 31 accidentally working out when the bits are collapsed I prefer to provide a pin 34 through the shank of the cutter at a point near the bottom of the slot or key-seat 25. Preferably these pins are so located in the key-seats 25 and the width of the key 31 such that the lower edges of the tangs will rest on these pins 34 before the main body portion of the key passes downward completely out of the socket or inclosed slot portion 32 of the bits. The key 31 is thus held in proper position in the bits and binding or wedging of the key in either bit prevented. As indicated in Fig. 16 the body 2 is slightly cut away at 35 on each side to afford easy access for riveting the pins 34 in the cutter shank after the cutters or bits have been assembled on the key 31 and rod 8 in the reamer body.

In Fig. 17 a portion of the lower end of the rod 8 is broken away to show the threaded opening into which a rod may be secured for the purpose of drawing the rod 8 and bits down into collapsed position for removing the bits or replacing them with new or sharpened bits.

in a pocket formed in the bit shank with metal on three sides of the pocket an extremely strong shank is provided. By providing the tanged key 32 and the sockets in the bits therefor, together with means for preventing the body portion of the key leaving the sockets while the reamer is assembled, the binding or wedging of either of the bits on the key is obviated and breakage or bending of the bits from such cause eliminated.

I claim as my invention:

1. An underreamer having a body with inclined end surfaces forming expansion and upthrust bearings and inthrust bearings at the central portion of the body above such expansion bearings and with grooves at each side of such bearings, and pocket cutters having strengthening ribs fitting into said grooves when the cutters are collapsed.

2. An underreamer having a body with inthrust bearings at its center terminating in inclined end expansion surfaces and with grooves at each side of said inthrust bearings and cutters having inthrust bearings to contact with the inthrust bearings of the body when in expanded position and with shanks having pockets containing the expansion shoulders and strengthening ribs resting in said grooves of the body when the cutters are collapsed.

3. An underreamer body having oppositely disposed inthrust bearings centrally arranged at the end of the body and grooved ways at the sides of the bearings and expanding surfaces at the end of the body, and cutters having body portions of a width greater than said inthrust bearings and shanks provided with inthrust bearings to contact with said inthrust bearings of said body and provided with pockets forming expansion shoulders coöperating with the expanding surfaces and strengthening ribs engaging in the grooved ways.

4. An underreamer cutter having a body portion and a shank portion of less width, said shank portion provided with a pocket forming an expansion shoulder.

5. An underreamer cutter having a body portion and a shouldered shank portion of less width, said shank portion provided on its inner face with an inthrust bearing and with a pocket forming an expansion shoulder.

6. An underreamer cutter having a body portion and a shouldered shank portion of less width, said shank portion provided on its inner face with an inthrust bearing, a pocket forming an expansion shoulder and strengthening ribs at the sides of said pocket, and an upthrust shoulder on the body portion below the junction of the shank with the body.

7. An underreamer cutter having a body portion and a shank portion having an expansion shoulder, a key-seat and a key socket communicating with the key-seat.

8. An underreamer cutter having a shank provided with a key slot and a key socket above such slot.

9. An underreamer cutter having a shank provided with a key slot, a key socket above such slot, and a pocket forming an expansion shoulder.

10. An underreamer cutter having a shank provided with a key-slot, a key socket above such slot, a pocket forming an expansion shoulder, and an inthrust bearing below such pocket.

11. An underreamer cutter having a shank provided with a key slot, a key socket above such slot, a pocket forming an expansion shoulder and an inthrust bearing below such pocket, and dovetail shoulders.

12. An underreamer cutter having a shank provided with longitudinal dovetails or shoulders on its sides and with a pocket forming an expansion shoulder on its face.

13. An underreamer cutter having a shank provided with longitudinal dovetails or shoulders on its sides and with an inthrust bearing on its face and a pocket above said bearing forming an expansion shoulder.

14. An underreamer cutter having a shank provided with longitudinal dovetails or shoulders on its sides and with an inthrust bearing on its face and a pocket above said bearing forming an expansion shoulder, a key slot and a key socket above said shoulder, and having a body portion forming at the junction of the shank and body portions an upthrust bearing.

15. An underreamer comprising a body having oppositely disposed dovetail slipways with an inthrust bearing at the mouth of each slipway, cutters having dovetail shanks mounted for longitudinal movement in said slipways, inthrust bearings on the inner faces of the shanks near the junction of the shanks with the body portions of the cutters, the shanks provided with pockets above said last mentioned bearings, and automatic means for moving and normally holding said cutters up in said slipways.

16. An underreamer comprising a body provided with inthrust bearings at its end and grooves at the sides of said bearings and with dovetail slipways, cutters having dovetail shanks, and automatic means for moving and normally holding said cutters up in said slipways, the shanks of said cutters provided with expansion shoulders and with strengthening ribs, at the sides of said shoulders, adapted to enter said grooves when the cutters are collapsed.

17. An underreamer comprising a body having inthrust bearings and expansion shoulders, a spring actuated rod in said body, a key loosely mounted on said rod, cutters having shanks extending into said body and provided with inthrust bearings and expansion shoulders and with sockets in which said key is seated and confined against transverse movement.

18. An underreamer having a body provided with inthrust bearings and expansion shoulders, a spring actuated rod mounted on said body, a key loosely mounted on said rod, cutters having inthrust bearings and expansion shoulders and having key slots and key sockets to receive and maintain in position said key.

19. An underreamer having a body provided with inthrust bearing and cutter expanding surfaces, a spring actuated rod mounted in said body, a key loosely mounted on said rod and provided with tangs, cutters having inthrust bearings and expansion shoulders and having key slots to receive the tangs and key sockets in which said key is seated and confined transversely, and means for preventing the accidental displacement of said key.

Signed at Pittsburgh, Pennsylvania, this 21st day of January, 1919.

EDWARD DOUBLE.

In presence of:
FREDERICK S. LYON,
R. M. GOLDSBOROUGH.